United States Patent
Udeshi et al.

(10) Patent No.: US 9,002,636 B2
(45) Date of Patent: Apr. 7, 2015

(54) CONTEXTUAL TRAFFIC OR TRANSIT ALERTS

(71) Applicant: Google Inc., Mountain View, CA (US)

(72) Inventors: Tushar Udeshi, Broomfield, CO (US); Tom Carl Stamm, Louisville, CO (US); Dale Hawkins, Erie, CO (US); Pablo Bellver, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/940,338

(22) Filed: Jul. 12, 2013

(65) Prior Publication Data

US 2013/0345953 A1 Dec. 26, 2013

Related U.S. Application Data

(63) Continuation of application No. PCT/US2013/047080, filed on Jun. 21, 2013.

(60) Provisional application No. 61/663,049, filed on Jun. 22, 2012, provisional application No. 61/663,813, filed on Jun. 25, 2012.

(51) Int. Cl.
*G01C 21/36* (2006.01)
*G01C 21/00* (2006.01)

(52) U.S. Cl.
CPC ............ *G01C 21/3617* (2013.01); *G01C 21/00* (2013.01); *G01C 21/3691* (2013.01)

(58) Field of Classification Search
USPC ......... 701/117, 118, 119, 465, 468, 521, 526, 701/532
See application file for complete search history.

(56) References Cited

U.S. PATENT DOCUMENTS

| | | | |
|---|---|---|---|
| 6,177,905 B1* | 1/2001 | Welch ...................... | 342/357.75 |
| 6,587,782 B1* | 7/2003 | Nocek et al. .................. | 701/438 |
| 6,850,837 B2* | 2/2005 | Paulauskas et al. ........... | 701/426 |
| 7,243,130 B2 | 7/2007 | Horvitz et al. | |
| 7,289,812 B1* | 10/2007 | Roberts et al. ............. | 455/456.1 |
| 7,412,326 B2 | 8/2008 | Yoshioka et al. | |
| 7,490,003 B2* | 2/2009 | Flynt ............................. | 701/408 |
| 7,574,661 B2 | 8/2009 | Matsuura et al. | |
| 7,630,828 B2 | 12/2009 | Tajima et al. | |
| 7,831,384 B2 | 11/2010 | Bill | |
| 7,835,859 B2 | 11/2010 | Bill | |
| 7,840,331 B2 | 11/2010 | Yoshioka et al. | |
| 7,847,686 B1* | 12/2010 | Atkins et al. ............. | 340/539.13 |
| 7,885,761 B2 | 2/2011 | Tajima et al. | |
| 7,885,762 B2 | 2/2011 | Tajima et al. | |
| 8,068,977 B2 | 11/2011 | Ozawa et al. | |
| 8,131,467 B2 | 3/2012 | Yoshioka et al. | |
| 8,166,019 B1 | 4/2012 | Lee et al. | |
| 8,170,960 B1 | 5/2012 | Bill | |
| 8,458,102 B2 | 6/2013 | Bill | |
| 8,498,809 B2 | 7/2013 | Bill | |
| 8,498,953 B2 | 7/2013 | Lehmann et al. | |
| 8,571,724 B2 | 10/2013 | Brennan et al. | |

(Continued)

*Primary Examiner* — Rami Khatib
(74) *Attorney, Agent, or Firm* — Shumaker & Sieffert, P.A.

(57) ABSTRACT

A computing system is described that can provide a user with alerts based on traffic information related to the user's expected travel route. In some embodiments, a user can be alerted if a traffic delay exists on the user's expected travel route. In other embodiments, a user can be alerted when their usual bus or train is delayed. In further embodiments, a user can be alerted when traffic on an expected route to the user's next event location might impact the user's ability to arrive at that location on time.

20 Claims, 6 Drawing Sheets

(56) References Cited

U.S. PATENT DOCUMENTS

| | | |
|---|---|---|
| 8,572,008 B2 | 10/2013 | Ide et al. |
| 2002/0019835 A1* | 2/2002 | Baur et al. ............... 707/503 |
| 2004/0127217 A1 | 7/2004 | Aoki et al. |
| 2006/0156209 A1 | 7/2006 | Matsuura et al. |
| 2006/0167592 A1 | 7/2006 | Kudo et al. |
| 2006/0173841 A1* | 8/2006 | Bill ............................ 707/6 |
| 2006/0273930 A1* | 12/2006 | Godden ..................... 340/988 |
| 2007/0010942 A1 | 1/2007 | Bill |
| 2007/0042770 A1 | 2/2007 | Yasui et al. |
| 2007/0078599 A1 | 4/2007 | Yoshioka et al. |
| 2007/0276585 A1* | 11/2007 | Hisada et al. ............. 701/200 |
| 2007/0288157 A1* | 12/2007 | Peterman ................. 701/207 |
| 2007/0288159 A1* | 12/2007 | Skelton ..................... 701/207 |
| 2007/0288279 A1* | 12/2007 | Haugen et al. ............... 705/8 |
| 2008/0086455 A1* | 4/2008 | Meisels et al. ............... 707/3 |
| 2008/0155080 A1 | 6/2008 | Marlow et al. |
| 2008/0167802 A1 | 7/2008 | Yoshioka et al. |
| 2008/0167937 A1* | 7/2008 | Coughlin et al. ............... 705/9 |
| 2008/0177462 A1 | 7/2008 | Yoshioka et al. |
| 2008/0262667 A1 | 10/2008 | Otabe |
| 2009/0048774 A1 | 2/2009 | Yoshioka et al. |
| 2009/0105934 A1 | 4/2009 | Tajima et al. |
| 2009/0192702 A1 | 7/2009 | Bourne |
| 2009/0248284 A1 | 10/2009 | Yoshioka et al. |
| 2009/0312946 A1 | 12/2009 | Yoshioka et al. |
| 2010/0036601 A1 | 2/2010 | Ozawa et al. |
| 2010/0042317 A1 | 2/2010 | Tajima et al. |
| 2010/0161213 A1 | 6/2010 | Tajima et al. |
| 2010/0174998 A1 | 7/2010 | Lazarus et al. |
| 2010/0190510 A1 | 7/2010 | Maranhas et al. |
| 2011/0090078 A1 | 4/2011 | Kim et al. |
| 2011/0106436 A1 | 5/2011 | Bill |
| 2011/0126184 A1 | 5/2011 | Lisboa |
| 2011/0137831 A1 | 6/2011 | Ide et al. |
| 2011/0137834 A1 | 6/2011 | Ide et al. |
| 2011/0153629 A1 | 6/2011 | Lehmann et al. |
| 2011/0161001 A1 | 6/2011 | Fink |
| 2011/0175724 A1 | 7/2011 | Kent |
| 2011/0225532 A1 | 9/2011 | Isert et al. |
| 2011/0246404 A1* | 10/2011 | Lehmann et al. ............. 706/21 |
| 2011/0302116 A1 | 12/2011 | Ide et al. |
| 2011/0313956 A1 | 12/2011 | Abe et al. |
| 2011/0313957 A1 | 12/2011 | Ide et al. |
| 2011/0319094 A1 | 12/2011 | Usui et al. |
| 2012/0058778 A1 | 3/2012 | Waters et al. |
| 2012/0102013 A1 | 4/2012 | Martini |
| 2012/0197463 A1 | 8/2012 | Brennan et al. |
| 2012/0221231 A1 | 8/2012 | Nagata et al. |
| 2012/0221493 A1 | 8/2012 | Bill |
| 2012/0271676 A1 | 10/2012 | Aravamudan et al. |
| 2013/0036117 A1 | 2/2013 | Fisher et al. |
| 2013/0059607 A1 | 3/2013 | Herz et al. |
| 2013/0103300 A1 | 4/2013 | Rakthanmanon et al. |
| 2013/0197890 A1 | 8/2013 | Ide et al. |
| 2013/0218445 A1 | 8/2013 | Basir |
| 2013/0262354 A1 | 10/2013 | Ide et al. |
| 2013/0321178 A1 | 12/2013 | Jameel et al. |

* cited by examiner

CONTEXTUAL TRAFFIC OR TRANSIT ALERTS

This application is a Continuation of Application Serial No. PCT/US2013/47080, filed Jun. 21, 2013 and claims the benefit of U.S. Provisional Application No. 61/663,049, filed Jun. 22, 2012, and U.S. Provisional Application No. 61/663,813, filed Jun. 25, 2012, the entire contents of each of which are hereby incorporated by reference.

BACKGROUND

Traffic is a constant problem in the modern world. Traffic can cause travel delays resulting in missed appointments and late arrivals. Reminders of upcoming appointments and events can be provided using various software applications, such as calendar applications. However, these reminders are typically based on a fixed window of time that does not take into account outside variables, such as traffic on the route to the event or appointment.

Although traffic information is readily available in various forms both online and in conventional media, that information is only useful if a user remembers to access it. To obtain useful information, users must also provide information about their intended route. These steps are cumbersome and time consuming. Accordingly, there remains a need for systems and processes for providing relevant and timely traffic information to a user.

SUMMARY

In one example, a method is provided for generating contextually-relevant traffic alerts using a computer processor. The method includes receiving information indicative of an expected travel route of a user and an expected departure time for the expected travel route. For example, the expected travel route can include historical location information. The method can also include storing the received information in a memory. The method also includes defining a time interval before the expected departure time and, for at least one time during the time interval, fetching traffic information associated with the expected travel route. For example, the time interval can be approximately one hour. The method further includes determining, using a processor coupled with the memory, whether a traffic delay exists on the expected travel route for the at least one time during the time interval, and storing a result of that determination in the memory.

In some examples, the method can also include repeating, at a plurality of times during the time interval, the steps of fetching traffic information associated with the expected travel route, determining whether a traffic delay exists on the expected travel route for the at least one time during the time interval, and storing a result of that determination in the memory. The method can further include outputting a traffic alert to a mobile device associated with the user based on the result of that determination. In one example, the method can include calculating an alternate travel route, where the traffic alert includes the alternate travel route.

In a further example, another method is provided for generating contextually-relevant alerts using a computer processor. The method includes receiving event information associated with a user. For example, the event information can include an event location and an event time. The method also includes receiving information indicative of a current location of the user. The method can also include storing the received information in a memory. The method further includes calculating, using a processor coupled with the memory, an expected travel route from the current location to the event location. For example, the expected travel route can include historical location information. In other examples, a shortest route can be determined from the current location to the event location, where the expected route is based upon that shortest route.

The method also includes defining a time interval before the event time and, at a first time during the time interval, fetching traffic information associated with the expected travel route. For example, the time interval can be approximately six hours. The method further includes determining an estimated trip time for the expected travel route based at least in part on the traffic information, calculating a difference between an amount of time remaining until the event time and the estimated trip time, and storing a result of that calculation in the memory.

In some examples, the method can include repeating, at a plurality of times during the time interval, the steps of fetching traffic information associated with the expected travel route, determining an estimated trip time for the expected travel route based at least in part on the traffic information, calculating a difference between an amount of time remaining until the event time and the estimated trip time, and storing a result of that calculation in the memory.

The method can further include outputting an alert to a mobile device associated with the user when the result of the calculated difference between an amount of time remaining until the event time and the estimated trip time is less than a threshold value. For example, the threshold value can be in the range of about zero minutes to about 15 minutes.

In another example, a system for generating contextually-relevant traffic alerts is provided that includes a processor and a memory having instructions stored thereon for execution by the processor. The instructions can include a route and departure time receiving module that receives information indicative of an expected travel route of a user and an expected departure time for the expected travel route, a traffic data collection module fetches traffic information associated with the expected travel route for at least one time within a time interval before the expected departure time, and a traffic data processing module that processes the traffic information to determine whether a traffic delay exists on the expected travel route for the at least one time during the time interval.

In some examples, the instructions can also include an output module that outputs a traffic alert to a mobile device associated with the user based on whether a traffic delay exists on the expected travel route for the at least one time during the time interval. The instructions can also include a route calculation module that calculates an alternative travel route, wherein the traffic alert includes the alternate travel route.

In a further example, another system for generating contextually-relevant alerts is provided that includes a processor and a memory having instructions stored thereon for execution by the processor. The instructions can include an event information receiving module that receives information associated with a user, the event information including an event location and an event time, a location receiving module that receives information indicative of a current location of the user, a route calculation module that calculates an expected travel route from the current location to the event location and a traffic data collection module fetches traffic information associated with the expected travel route for a first time during a time interval before the event time.

In one example, the instructions can also include a traffic data processing module that processes the traffic information to determine an estimated trip time for the expected travel route based at least in part on the traffic information and calculates a difference between an amount of time remaining until the event time and the estimated trip time. For example, the expected travel route can be based on at least one of historical location information and a shortest route from the current location to the event location. The instructions can further include an output module that outputs a traffic alert to a mobile device associated with the user when the difference between an amount of time remaining until the event time and the estimated trip time is less than a threshold value. For example, the threshold value can be in the range of about zero minutes to about 15 minutes.

The details of one or more examples are set forth in the accompanying drawings and the description below. Other features, objects, and advantages of the disclosure will be apparent from the description and drawings, and from the claims.

DETAILED DESCRIPTION

Techniques are disclosed herein that generally involve providing a user with alerts based on traffic information related to the user's expected travel route. In some examples, a user can be alerted if a traffic delay exists on the user's expected travel route. In other examples, a user can be alerted when their usual bus or train is delayed. In further examples, a user can be alerted when traffic on an expected route to the user's next event location might impact the user's ability to arrive at that location on time.

Certain examples will now be described to provide an overall understanding of the principles of the structure, function, manufacture, and use of the described techniques. One or more examples are illustrated in the accompanying drawings. Those skilled in the art will understand that the described techniques are non-limiting examples. The features illustrated or described in connection with one example may be combined with the features of other examples. Such modifications and variations are intended to be included within the scope of the described techniques.

In situations discussed below in which systems and devices collect or make use of personal information about the user (e.g., search histories, location, etc.) the user may be provided with an opportunity to control whether programs or features of the systems and devices can collect user information (e.g., information about a user's e-mail, a user's social network, social actions or activities, profession, a user's preferences, user's Internet search history, a user's current location, etc.), or to control whether and/or how to the systems and devices may receive content that may be relevant to the user. In addition, certain data may be treated in one or more ways before it is stored or used by the systems and devices, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the systems and devices described herein.

Figure 1:
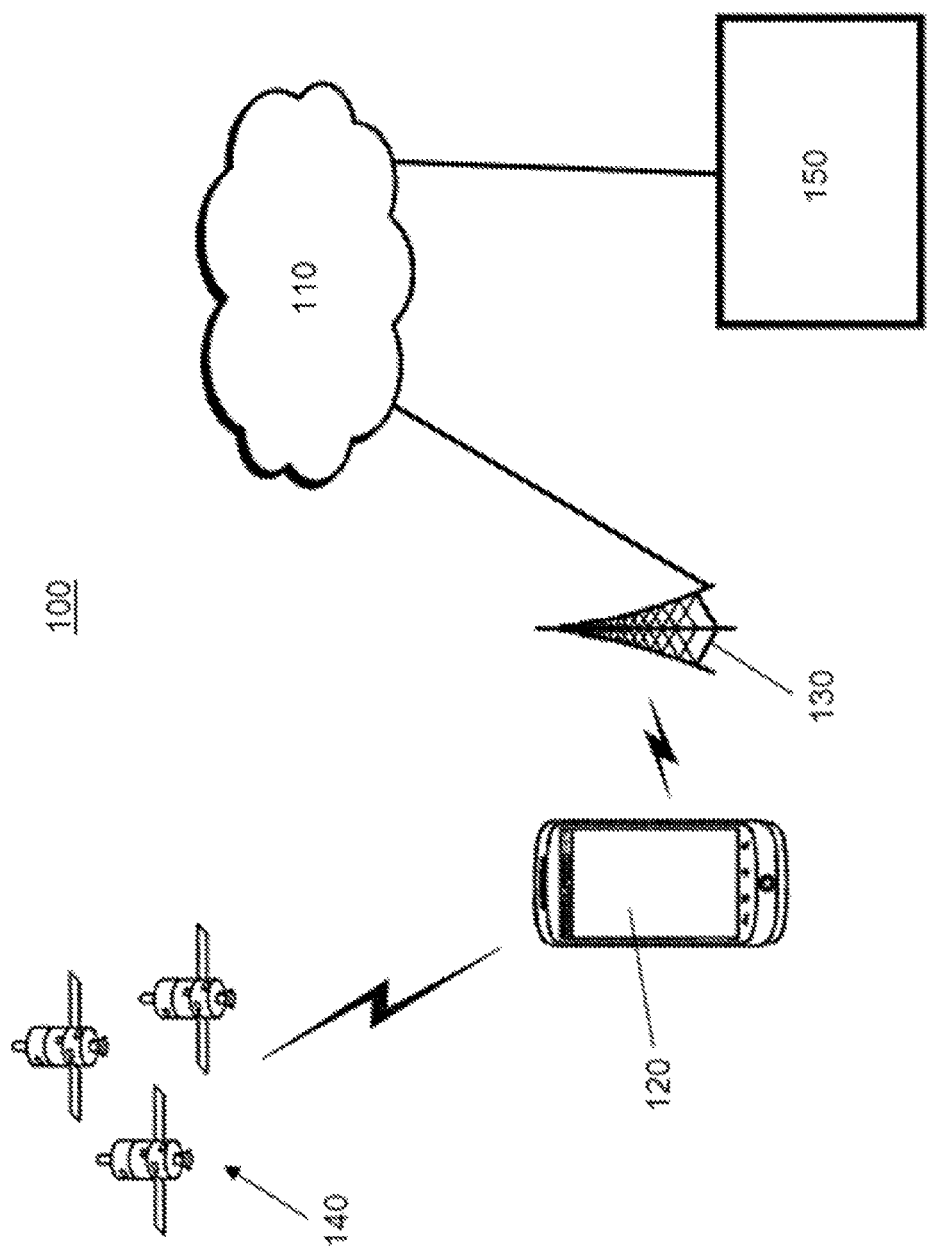
FIG. 1 is a schematic diagram of one example of a mobile network.

FIG. 1 illustrates an example of a mobile network 100 in which one or more of the described techniques can be implemented. The mobile network 100 includes a communications network 110 and a mobile device 120. The mobile device 120 can connect to the communications network 110 via various access points 130. Although one mobile device 120 and one access point 130 are illustrated for brevity, the mobile network 100 can include any number of mobile devices and access points.

The mobile device 120 can be or can include any computing device (also referred to herein as simply a "device") that is configured to exchange data over the communications network 110, such as a mobile phone, tablet computer, laptop computer, and so forth. The mobile device 120 can also be or can include devices that are not necessarily "mobile," such as desktop computers. The communications network 110 can include any of a variety of networks or combinations of networks, such as GSM, TDMA, CDMA, IEEE 802.11, Bluetooth, Wi-Fi, or any other wired or wireless networks. The access points 130 can be transceivers that provide a gateway between the mobile device 120 and the communications network 110. For example, the access points 130 can be wireless routers or cellular network towers. In some examples, the mobile device 120 can also receive Global Positioning System (GPS) signals transmitted from GPS satellites 140.

In the illustrated example, the mobile network 100 also includes a server 150 that can exchange data with the mobile device 120 via the communications network 110. The server 150 can be implemented on one or more computer systems (e.g., server computers, personal computers, workstations, mini-computers, clustered computer systems, or embedded computer systems). Some or all of the server 150 functionality can also be implemented on the mobile device 120 itself.

Figure 2:
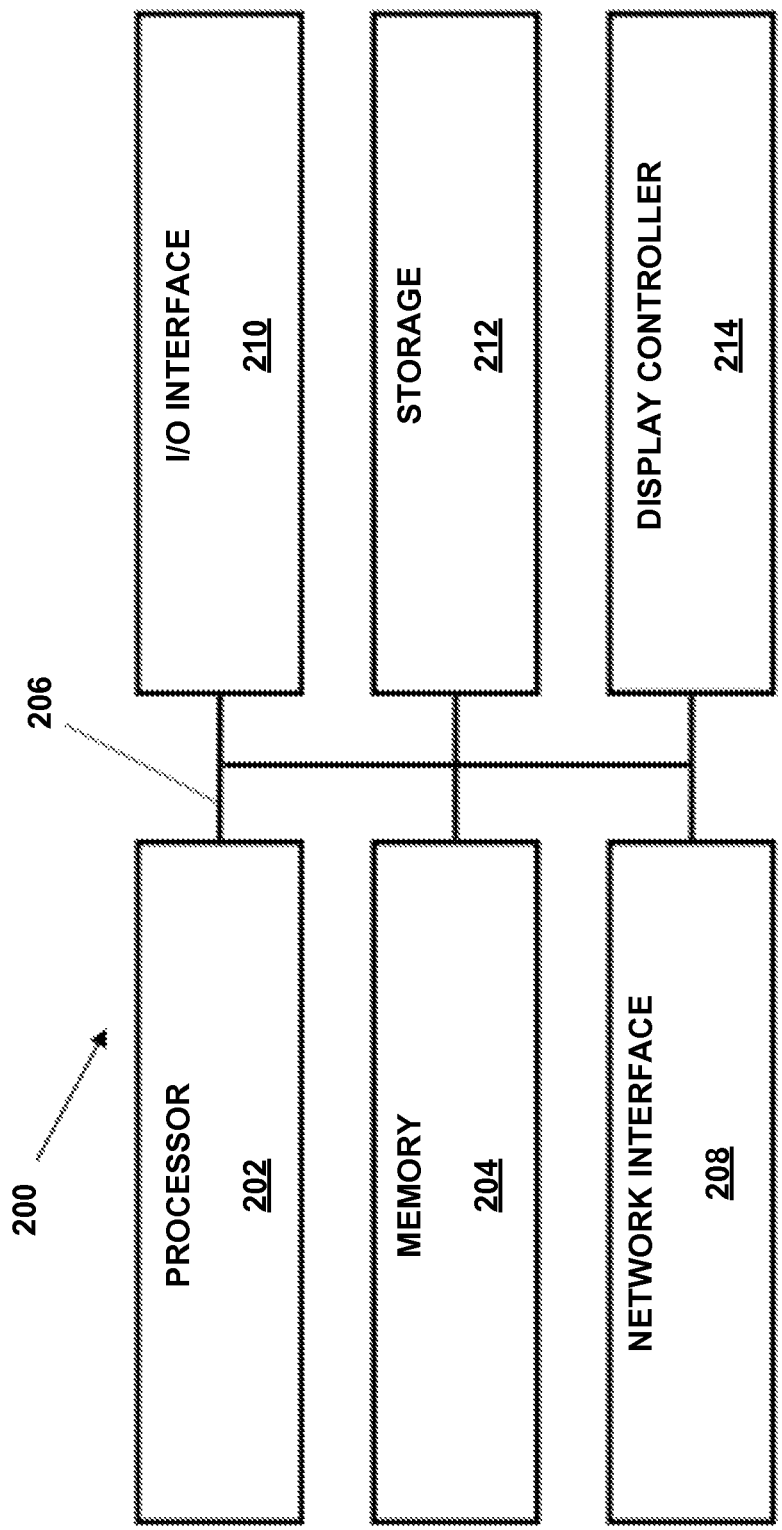
FIG. 2 is a schematic diagram of one example of a computer system.

FIG. 2 illustrates an architecture of a computer system 200 which can be used to implement the mobile device 120 or the server 150 of FIG. 1. Although an computer system 200 is depicted and described herein, it will be appreciated that this is for sake of generality and convenience. In other examples, the computer system may differ in architecture and operation from that shown and described here.

The illustrated computer system 200 includes a processor 202 which controls the operation of the computer system 200, for example by executing an operating system (OS), device drivers, application programs, and so forth. The processor 202 can include any type of microprocessor or central processing unit (CPU), including programmable general-purpose or special-purpose microprocessors and/or any of a variety of proprietary or commercially-available single or multi-processor systems. The computer system 200 also includes a memory 204, which provides temporary or permanent storage for code to be executed by the processor 202 or for data that is processed by the processor 202. The memory 204 can include read-only memory (ROM), flash memory, one or more varieties of random access memory (RAM), and/or a combination of memory technologies. The various elements of the computer system 200 are coupled to a bus system 206. The illustrated bus system 206 is an abstraction that represents any one or more separate physical busses, communication lines/interfaces, and/or multi-drop or point-to-point connections, connected by appropriate bridges, adapters, and/or controllers.

The computer system 200 also includes a network interface 208, an input/output (I/O) interface 210, a storage device 212, and a display controller 214. The network interface 208 enables the computer system 200 to communicate with remote devices (e.g., other computer systems) over a network. The I/O interface 210 facilitates communication between one or more input devices, one or more output devices, and the various other components of the computer system 200. The storage device 212 can include any conventional medium for storing data in a non-volatile and/or non-transient manner. The storage device 212 can thus hold data and/or instructions in a persistent state (i.e., the value is retained despite interruption of power to the computer system 200). The storage device 212 can include one or more hard disk drives, flash drives, USB drives, optical drives, various media disks or cards, and/or any combination thereof and can be directly connected to the other components of the computer system 200 or remotely connected thereto, such as over a network. The display controller 214 includes a video processor and a video memory, and generates images to be displayed on one or more displays in accordance with instructions received from the processor 202.

The various functions performed by the server 150 or the mobile device 120 can be logically described as being performed by one or more modules. It will be appreciated that such modules can be implemented in hardware, software, or a combination thereof. It will further be appreciated that, when implemented in software, modules can be part of a single program or one or more separate programs, and can be implemented in a variety of contexts (e.g., as part of an operating system, a device driver, a standalone application, and/or combinations thereof). In addition, software embodying one or more modules can be stored as an executable program on one or more non-transitory computer-readable storage mediums. Functions disclosed herein as being performed by a particular module can also be performed by any other module or combination of modules, and the server 150 or the mobile device 120 can include fewer or more modules than what is shown and described herein.

In situations discussed below in which the different modules, systems, and devices collect or make use of personal information about the user (e.g., search histories, location, etc.) the user may be provided with an opportunity to control whether the modules, systems, and devices can collect user information or to control whether and/or how to the modules, systems, and devices may receive content that may be relevant to the user. In addition, certain data may be treated in one or more ways before it is stored or used by the modules, systems, and devices, so that personally identifiable information is removed. Thus, the user may have control over how information (e.g., data) is collected about the user and used by the modules, systems, and devices described herein.

Figure 3:
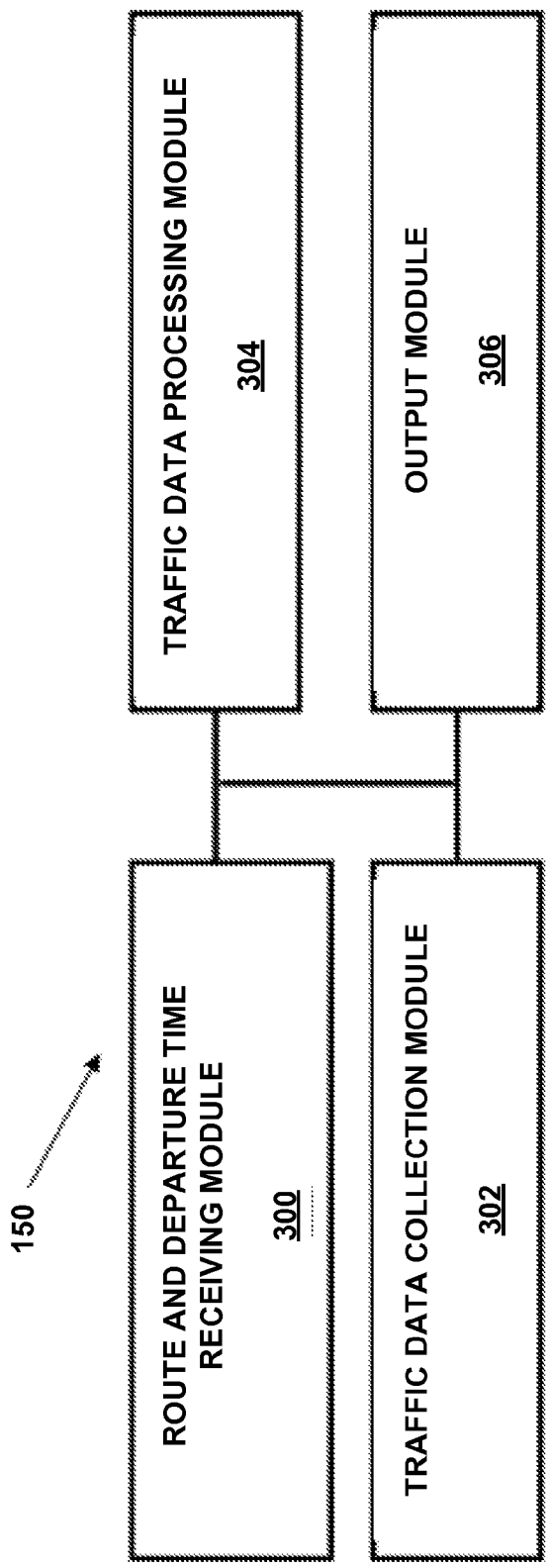
FIG. 3 is a schematic diagram of one example of a traffic alert server.

FIG. 3 is a schematic diagram of the modules of one example of the server 150. In this example, the server can provide an alert if a traffic delay exists on a user's expected travel route. In one example, as shown in FIG. 3, the server 150 can include a route and departure time receiving module 300 configured to receive route and departure time data. The route and departure time data can be indicative of an expected travel route of a user and an expected departure time for that expected travel route. The expected travel route of the user can be inferred from historical location data. For example, a user's location and travel history can be inferred based on the location and travel history of the user's mobile device.

In some examples, location information can be stored at various time intervals to provide a location history of the device and the user. For instance, an application executing at a user's mobile device may determine and store the location of the user's mobile device to create a location history. This location history could be stored in a cache or other memory on the mobile device, or it could be transmitted to a server over a mobile network and stored in a data store.

The location history of the mobile device can be analyzed over a period of time to infer a particular recurring travel route between recurring locations. For example, the user's home location can be inferred based on the most common location in the location history over a period of time during the night. Likewise, the user's work location can be inferred based on the most common location in the location history over a period of time during the day. Similarly, the user's expected travel route between the user's home location and work location can be inferred based on the most common travel route taken between those locations.

The route data can also include information related to the mode of transportation for the route. The route data can also be used to infer the user's mode of transportation. For example, the route data can be used to infer whether the user takes public transportation or whether they drive a car. The route data can also be used to infer which bus or train the user normally takes. For example, the route data can be compared to stored travel routes for public transportation. A match between the route data and a stored travel route for public transportation can be used to infer which bus or train route the user commonly uses.

The server 150 can also include a traffic data collection module 302 which can be configured to communicate with a database in which traffic information is stored. The database can be stored on the mobile device 120, on the server 150, and/or in other locations, such as a cloud-based repository. The traffic data collection module 302 can execute various operations with respect to the traffic database, such as reading information from the database or querying the database. For example, the traffic data collection module 302 can fetch traffic information associated with the expected travel route. The traffic data can include road traffic data or transit data regarding the status of public transportation.

The server 150 can also include a traffic data processing module 304. The traffic data processing module 304 can receive traffic information from the traffic data collection module 302. The traffic data processing module 304 can then process the traffic information to determine whether a traffic delay exists on the expected travel route received by the route and departure time receiving module 300. In other examples, when it can be inferred the user will travel by public transportation for example, the traffic data processing module 304 can process transit information to determine whether the public transportation taken by the user, e.g., bus, train, etc., is running late.

The server 150 can also include an output module 306 configured to output a traffic alert if traffic or transit delays exist on the expected travel route. The traffic alert can be sent as a data transmission via the mobile network 100 to the mobile device 120, which can in turn be configured to display or otherwise present the list or other information to the user. The presentation to the user can be in a standalone application, or in the mobile device's native mapping software, e.g., upon actuating a button or other user interface element. In some examples, the alert can be sent to other devices and applications associated with the user. For example, the alert can be sent to a web-based calendar application or other calendar application. The user can access the alert from a mobile device or other computing device, such as a desktop computer or laptop computer.

Figure 4:
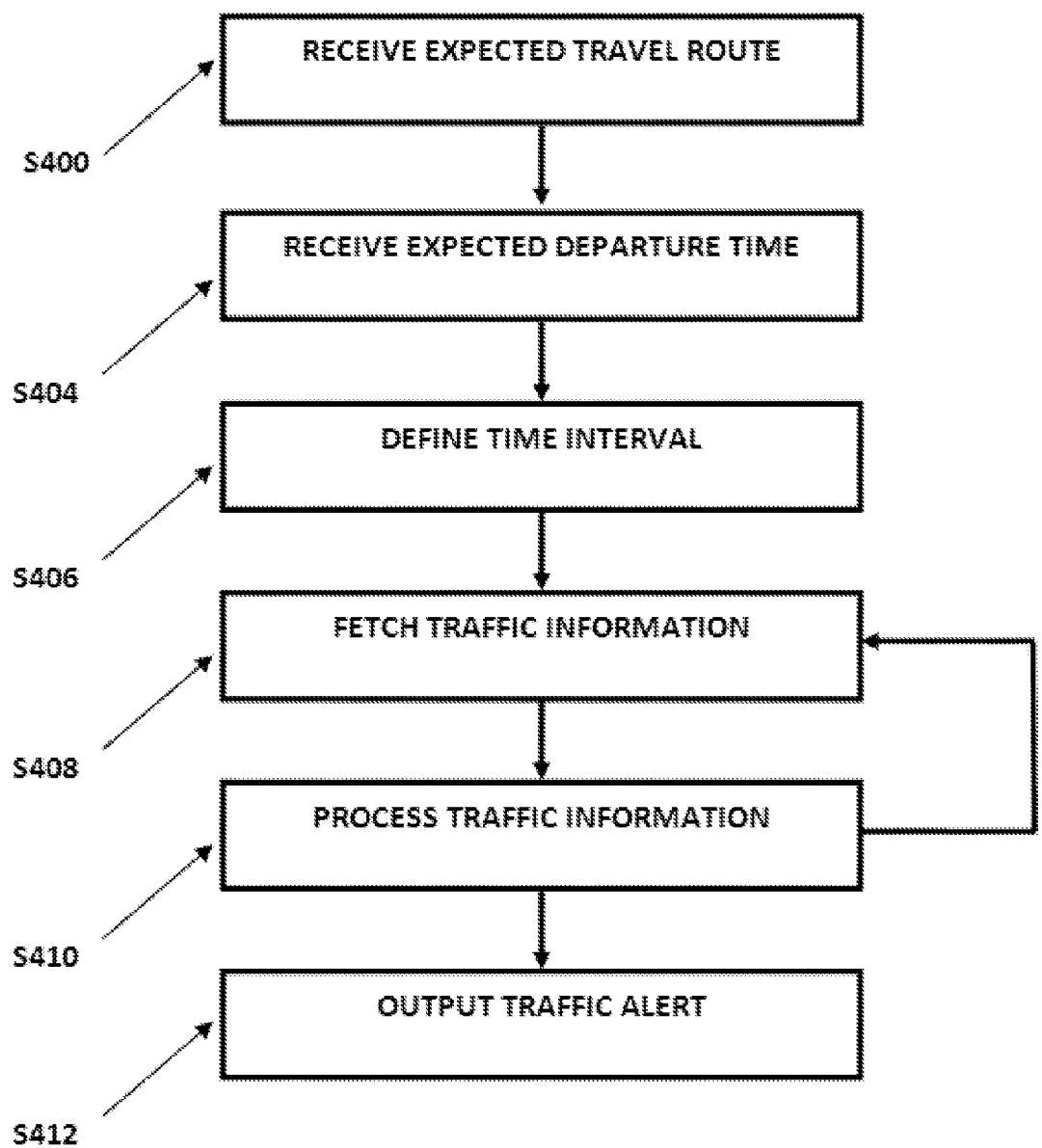
FIG. 4 is a flowchart that schematically depicts example operations for generating contextually-relevant traffic alerts.

Example operations for generating contextually-relevant traffic alerts are illustrated schematically in the flowchart of FIG. 4. While various operations disclosed herein may be shown in relation to a flowchart or flowcharts, it should be noted that any ordering of steps implied by such flowcharts or the description thereof is not to be construed as limiting the operations to performing the steps in that order. Rather, the various steps of the operations disclosed herein can be performed in any of a variety of sequences. In addition, as the illustrated flowchart(s) are merely examples, various other operations that include additional steps or include fewer steps than illustrated are also within the scope of the described techniques.

The illustrated operations, which in some examples can be executed by the server 150, begins at step S400 where information indicative of a user's expected travel route is received. The user's expected travel route can, in some examples, be based on historical location data. For example, location data collected from the user's mobile device during previous trips along the expected travel route can be used to determine the user's typical travel route. For example, the expected travel route can be the user's daily commuting route. In some instances, the expected travel route can include the bus or train route the user normally takes.

Alternatively, an optimal route between the start and end points of the expected travel route can be calculated, e.g., based on the shortest route between those locations. The route can be calculated using various services that calculate directions between locations. For example, the expected travel route can be calculated by an online service such as an online directions engine.

The operations continue at step S404 where information indicative of an expected departure time for the expected travel route is received. The expected departure time can, in some examples, be inferred from historical data. For example, historical location data can be used to infer an expected departure time for a recurring trip. For example, location data can be analyzed to determine when a user usually leaves their home to begin their commute. Other types of data, both historical and real-time, can also be used to infer an expected departure time. For example, events detected by the user's mobile device, such as when the device is unplugged or otherwise removed from a charging device in the morning, can be used to infer that the user is about to begin their commute.

In step S406, a time interval before the expected departure time is defined. The time interval can cover any amount of time. For example, the time interval can be chosen so as to allow traffic information to be gathered and analyzed for a reasonable amount of time before the expected departure time. In an example, the time interval can be about one hour.

Execution continues at step S408 where, during the time interval defined in step S406, the traffic data collection module 302 of the server 150 can communicate with a database in which traffic information is stored and fetch traffic information associated with the expected travel route. The traffic information can include data on the speed of traffic on one or more road segments associated with the travel route. The traffic information can also include data on public transportation delays, e.g., bus or train delays. The public transportation delay data can include data from the public transportation authority showing that an expected bus or train is delayed by an amount of time (e.g., Bus #12 is running 20 minutes late). The traffic information can be obtained from the traffic information database any number of times during the time interval before the expected departure time. For example, the traffic information can be obtained only once, or a plurality of times.

The operations continue at step S410 where the traffic data processing module 304 determines whether a traffic delay exists on the travel route and stores that result in a memory. The traffic delay can include a delay for the public transportation normally taken by the user. Steps S408 and S410 can be repeated at a plurality of times during the time interval. For example, traffic information can be fetched and processed at a plurality of times during the time interval as the expected departure time approaches.

The determination of whether a traffic delay exists can be qualitative or quantitative and can be made based on any number of factors. For example, the traffic information can include data on the speed of traffic on one or more road segments associated with the travel route. The traffic information can also include data on the speed of public transportation on the travel route. Using speed data, a calculation of an estimated amount of travel time along the expected travel route can be made. If, for example, the estimated amount of travel time exceeds an expected amount of travel time along the route by a threshold amount, then the traffic data processing module can make a determination that a traffic delay exists on the expected route. The threshold amount can be expressed as a percentage. For example, if the estimated amount of travel time based on traffic information exceeds the expected amount of travel time by about 20%, then a determination can be made that a traffic delay exists on the expected route. The expected amount of travel time can, for example, be an average of historical travel times along the expected travel route. This can, for example, tell the user whether a particular commute will be longer (or shorter) than usual. Alternatively, navigation software can calculate an expected time with no delays, and delays from this expected time can be measured. It will be appreciated that other techniques can be used to make a determination of whether a traffic delay exists on the expected travel route.

In some examples, the operations can include can include calculating an alternate travel route. The alternate travel route can be calculated using various services, programs, or applications that calculate directions between locations. The an alternate travel route can also be calculated in view of the traffic information received from the traffic data collection module 302.

When a determination is made that a traffic delay exists on the expected travel route the output module, an alert can be output by the output module 306 for presentation to user, e.g., as illustrated in step S412. In particular, an alert can be transmitted to the user's mobile device 120 for presentation to the user. The output module can output the alert in any of various forms, e.g., as a text message, email, or other notification sent to the user's mobile device. The alert can include a suggestion of an alternate travel route. An example notification might say "traffic on your usual commute appears heavier than normal." Another example notification might say "traffic is heavier than usual on your usual commute, would you like an alternate route?" A further example notification for a user who uses public transportation might say "your usual bus, Bus #12, is running 20 minutes late."

In some examples, the alert can be sent to other devices and applications associated with the user. For example, the alert can be sent to a web-based calendar application or other calendar application. The user can access the alert from a mobile device or other computing device, such as a desktop computer or laptop computer.

In an example, the alert can be provided at substantially the same time as the determination is made. In other examples, it may be preferable to hold the alert until a time just before expected departure time. Accordingly, using the illustrated operations, a user can be provided with alerts based on traffic information related to the user's expected travel route.

Figure 5:
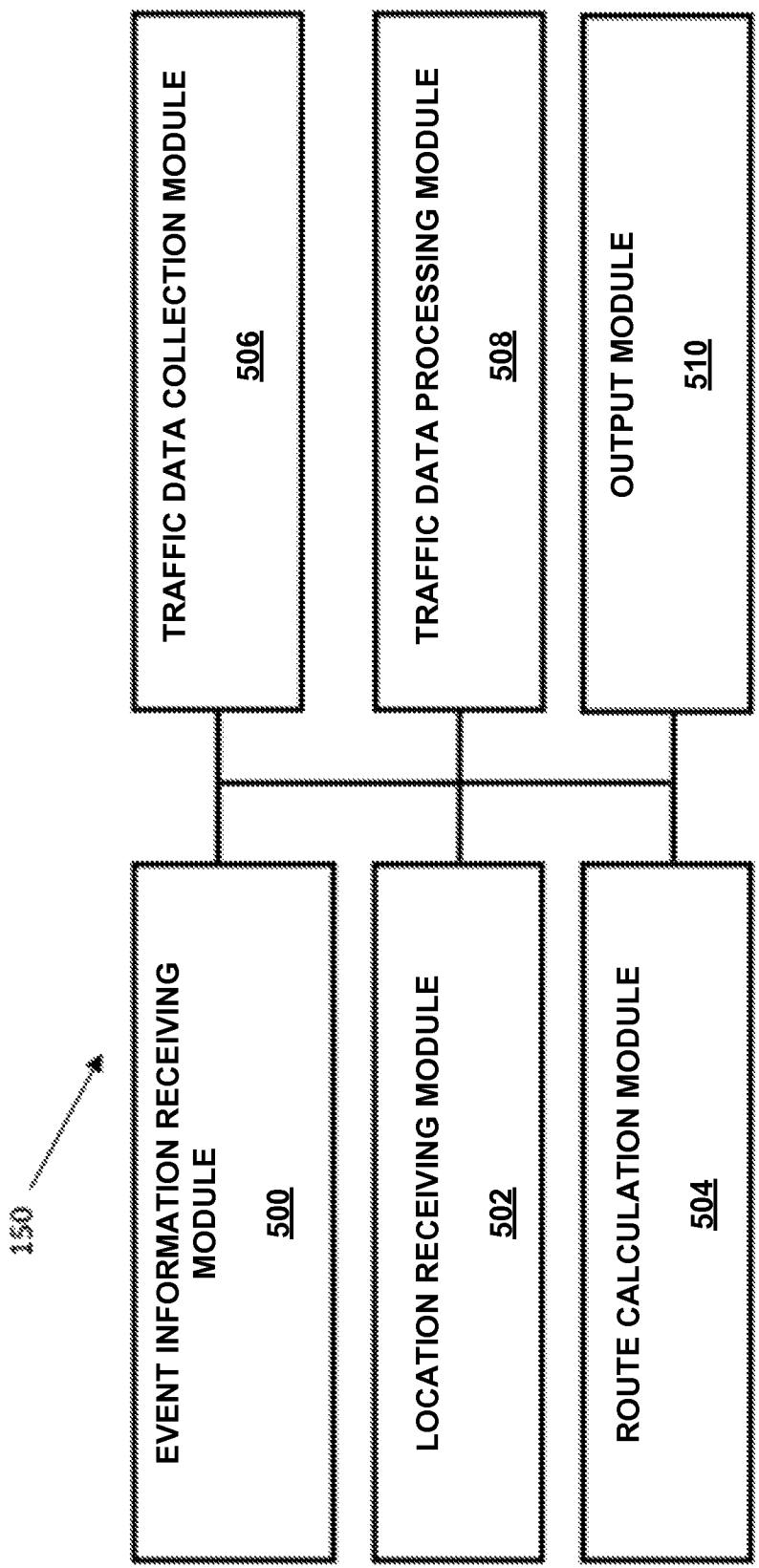
FIG. 5 is a schematic diagram of one example of an event alert server.

FIG. 5 is a schematic diagram of the modules of another example of the server 150. In this example, the server can provide an alert when traffic on an expected route to the user's next event location might impact the user's ability to arrive at that location on time.

In one example, as shown in FIG. 5, the server 150 can include an event information receiving module 500 configured to receive event information. The event information can include an event location and an event time. The event location and event time can be inferred from information provided by the user, e.g., from a calendar application, as discussed in more detail below. In situations described herein, in which modules, such as event information receiving module 500, collect or make use of personal information about the user, the user may be provided with an opportunity to control whether the programs or features of the modules can collect user information or to control whether and/or how the modules may receive content that may be relevant to the user. In addition, certain data may be treated in one or more ways before it is stored or used by the receiving modules so that personally identifiable information is removed.

As shown in FIG. 5, the server 150 can include a location receiving module 502 configured to receive location data. The location data can be indicative of the current location of the user.

In some instances, the current location of a user can be inferred from the current location of a mobile device or other object in the user's possession. In the example shown in FIG. 1, the mobile device 120 can be configured to periodically communicate its current location to the location receiving module 502 using the mobile network 100. This can occur several times per minute, once per minute, once per hour, or at any other regular or sporadic time interval. The mobile device 120 can determine or estimate its current location using any of a variety of known techniques, such as by processing GPS signals, by detecting proximity to cell towers, Wi-Fi hot spots, or other mobile access points 130 of known location, or by triangulating between the mobile device 120 and a plurality of such access points 130. In some examples, a computer program executing at module device 120 may obtain a user's current location or provide the best estimate of a user's location using a number of onboard or server-based sources (called location providers).

The location receiving module 502 can also receive the user's current location from other sources, such as when a user "checks in" at a location using any of a number of social applications that provide for such check-ins, when the user indicates their current position by dropping a pin at a particular location or making an equivalent selection using mapping software, or when the user responds to a prompt for their current position.

It will be appreciated that the location data received by the location receiving module 402 need not necessarily be indicative of the user's current location. Rather, the user can also provide some other location, such as a location that the user plans to visit in the future, in order to obtain alerts relevant to that location.

The location data received by the location receiving module 502 can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. The location receiving module 502 can also receive raw proximity or other data from the mobile device 120 and can perform any necessary triangulation or location calculations on the server side.

The server 150 can also include a route calculation module 504 which can be configured to calculate an expected travel route from the current location to the event location. In some examples, the expected travel route can be based on historical location information for the user on a route between the current location and the event location, as discussed in more detail below. In other examples, the expected travel route can be based on a shortest route from the current location to the event location, e.g., as calculated by an online directions service or engine.

The server 150 can also include a traffic data collection module 506 which can be configured to communicate with a database in which traffic information is stored. The database can be stored on the mobile device 120, on the server 150, and/or in other locations, such as a cloud-based repository. The traffic data collection module 406 can execute various operations with respect to the traffic database, such as reading information from the database or querying the database. For example, the traffic data collection module 506 can fetch traffic information associated with the expected travel route.

The server 150 can also include a traffic data processing module 508. The traffic data processing module 508 can receive traffic information from the traffic data collection module 506. The traffic data processing module 508 can then process the traffic information to determine estimated trip time for the expected travel route provided by the route calculation module 504. The traffic data processing module 508 can also calculate a difference between an amount of time remaining until the event time received by the event information receiving module and the estimated trip time.

The server 150 can also include an output module 510 configured to output a traffic alert when the difference between an amount of time remaining until the event time and the estimated trip time is less than a threshold value, as discussed in more detail below. The traffic alert can be sent as a data transmission via the mobile network 100 to the mobile device 120, which can in turn be configured to display or otherwise present the list or other information to the user. The presentation to the user can be in a standalone application, or in the mobile device's native mapping software, e.g., upon actuating a button or other user interface element. In some examples, the alert can be sent to other devices and applications associated with the user. For example, the alert can be sent to a web-based calendar application or other calendar application. The user can access the alert from a mobile device or other computing device, such as a desktop computer or laptop computer.

Figure 6:
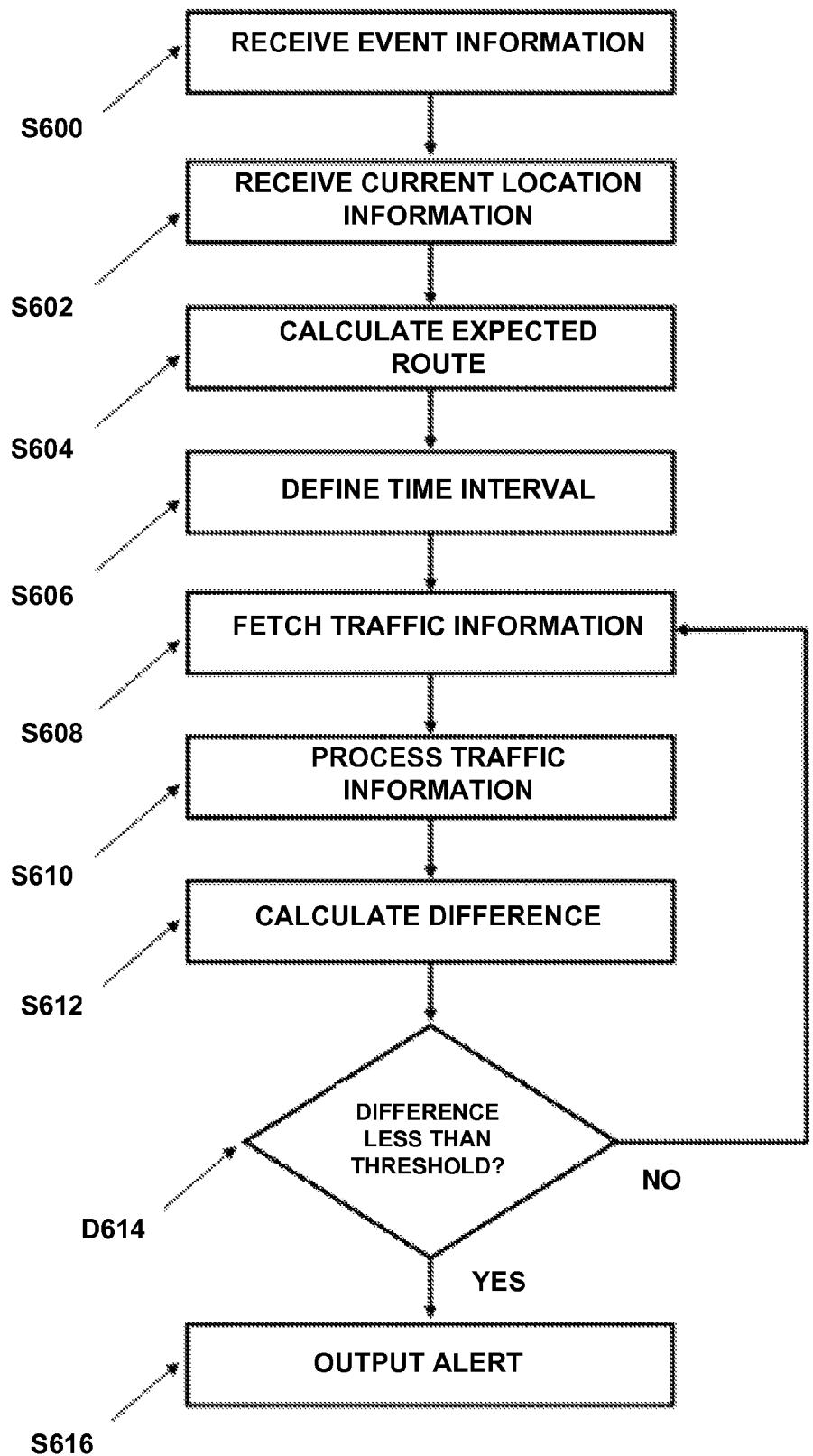
FIG. 6 is a flowchart that schematically depicts example operations for generating contextually-relevant alerts based on traffic information.

Operations for generating contextually-relevant alerts based on traffic information are illustrated schematically in the flowchart of FIG. 6. The illustrated operations, which in some examples can be executed by the server 150, begin at step S600 where event information associated with a user is received. The event information can include an event location and an event time. The event location and event time can be inferred from information provided by the user.

The event information receiving module 500 can receive data from a calendar application. The calendar application can execute on a server or on the user's mobile device. The data associated with the calendar application can include time, date, and location information for events, e.g., appointments, in the user's calendar. If explicit location information is not available for an event, the location can be inferred from the context of the appointment.

The operations continue at step S602 where information indicative of the current location of the user is received by the location receiving module 502. As discussed above, in some instances, the current location of a user can be inferred from the current location of a mobile device or other object in the user's possession. For example, the mobile device can be configured to periodically communicate its current location to the location receiving module using the mobile network. This can occur several times per minute, once per minute, once per hour, or at any other regular or sporadic time interval. The mobile device 120 can determine or estimate its current location using any of a variety of known techniques, such as by processing GPS signals, by detecting proximity to cell towers, Wi-Fi hot spots, or other mobile access points 130 of known location, or by triangulating between the mobile device 120 and a plurality of such access points 130. The location receiving module 502 can also receive the user's current location from other sources, such as when a user "checks in" at a location using any of a number of social applications that provide for such check-ins, when the user indicates their current position by dropping a pin at a particular location or making an equivalent selection using mapping software, or when the user responds to a prompt for their current position.

The location data received by the location receiving module 502 can be arranged in a format that includes a longitude, a latitude, and an accuracy radius. The accuracy radius can represent an estimate of the accuracy of the current location data. The accuracy radius can range from meters to kilometers depending on the source of the location data. For example, location data derived from GPS signals can have an accuracy radius of several meters while location data derived from triangulation of cell towers can have an accuracy radius of several kilometers. The location receiving module 502 can also receive raw proximity or other data from the mobile device 120 and can perform any necessary triangulation or location calculations on the server side. An expected departure time for the expected travel route is received. The expected departure time can, in some examples, be inferred from historical data. For example, historical location data can be used to infer an expected departure time for a recurring trip. For example, location data can be analyzed to determine when a user usually leaves their home to begin their commute to work. Other types of data, both historical and real-time, can also be used to infer an expected departure time. For example, events detected by the user's mobile device, such as when the device is unplugged or otherwise removed from a charging device in the morning, can be used to infer that the user is about to begin their commute to work.

The operations continue at step S604 in which an expected travel route from the current location to the event location is calculated by the route calculation module 504. The expected travel route can be based on historical location information collected by the server. For example, if the user has previously traveled between the current location and the event location, location data collected from the user's mobile device during those previous trips can be used to determine the user's typical travel route. Alternatively, the route calculation module can determine an optimal route between the current location and the event location, e.g., based on the shortest route between those locations. The optimal route can also be based on the fastest route between the current location and the event location in view of available traffic information. The route can be calculated using various services that calculate directions between locations. For example, the expected travel route can be calculated by a directions engine.

Execution continues at step S606 in which a time interval before the event time is defined. The time interval can cover any amount of time. For example, the time interval can be chosen so as to allow traffic information to be gathered and analyzed. The time interval can also be chosen so the alert, which is discussed in more detail below, can be output to the user when it is time to leave the current location in order to reach the event location before the event time. In an example, the time interval can be about six hours.

The operations continue at step S608 where, during the time interval defined in step S606, the traffic data collection module 506 of the server 150 can communicate with a database in which traffic information is stored and fetch traffic information associated with the expected travel route. The traffic information can include data on the speed of traffic on one or more road segments associated with the travel route. The traffic information can be obtained from the traffic information database any number of times during the time interval before the expected departure time. For example, the traffic information can be obtained only once, or a plurality of times.

The operations continue at step S610 where the traffic data processing module 508 determines an estimated trip time for the expected travel route based at least in part on the traffic information. For example, the route calculated by the route calculation module 508 can include an estimated time for travel between the beginning and end points of the route, e.g. between the current location and the event location. Traffic information can be used to augment the estimated time for travel to provide an more accurate estimate of the estimated trip time. For example, the traffic information can include data on the speed of traffic on one or more road segments associated with the travel route, which can be used to calculated the estimated trip time for the expected travel route.

At step S612, the traffic data processing module can calculate a difference between an amount of time remaining until the event time and the estimated trip time. The difference represents the amount of time remaining until the user must leave the current location to arrive at the event location on time, i.e., before the event time. For example, if the estimated trip time is 30 minutes and the amount of time remaining until the event time is 50 minutes, then the calculated difference will be 20 minutes. In such an example, there would be 20 minutes remaining until the user must leave the current location to arrive at the event location on time, i.e., before the event time. Steps S608, S610, and S612 can be repeated at a plurality of times during the time interval. Each time the steps are repeated, traffic information can be received, an estimated trip time can be determined, and a difference between the amount of time remaining until the event time and the estimated trip time can be calculated.

The operations continue at decision block D614, where it is determined whether the result of the difference calculated at step S612 is less than a threshold value. If the difference calculated at step S612 is not less than the threshold value ("NO" in decision block D614), execution returns to step S608 and the process repeats. When the difference calculated at step S612 is less than the threshold value ("YES" in decision block D614), execution proceeds to step S616. The threshold value represents a reminder window within which to provide the user a reminder when it is time to leave. For example, the threshold value can be in the range of about zero minutes to about 15 minutes.

At step S616, an alert can be output by the output module 510 for presentation to the user. In particular, an alert can be transmitted to the user's mobile device 120 for presentation to the user. The output module can output the alert in any of various forms, e.g., as a text message, email, reminder, or other notification sent to the user's mobile device. For example, the output module can output an alert that surfaces a reminder for the event, e.g., the calendar entry. The reminder can be modified from the usual event reminder to include a notification that the user must leave their current location in order to arrive at the event location on time. An notification might say "there is traffic on the route to your meeting, you should leave now to arrive on time." It will be appreciated that the threshold value used in decision block D614 can be used to provide the user with some warning of the time when they should leave. Such an notification might say, "there is traffic on the route to your meeting, you should leave in 15 minutes to arrive on time."

In some examples, the alert can be sent to other devices and applications associated with the user. For example, the alert can be sent to a web-based calendar application or other calendar application. The user can access the alert from a mobile device or other computing device, such as a desktop computer or laptop computer. Accordingly, using the illustrated operations, a user can be provided with alerts when traffic on an expected route to the user's next event location might impact the user's ability to arrive at that location on time. Although the techniques have been described by reference to specific examples, it should be understood that numerous changes may be made within the spirit and scope of the concepts described. Accordingly, it is intended that the techniques not be limited to the described examples, but that the techniques have the full scope defined by the language of the following claims.

What is claimed is:

1. A method comprising:
    receiving, by a computing system, a location history associated with a computing device and device information that indicates that the computing device is no longer charging at a current time;
    determining, by the computing system, based on the location history, an expected travel route of a user of the computing device to travel along to a destination and one or more past departure times when the user began traveling along the expected travel route to the destination;
    determining, by the computing system, based at least in part on the one or more past departure times and the device information, an expected departure time for the user to begin traveling along the expected travel route to the destination such that the user arrives at the destination by a future time;
    determining, by the computing system, based at least in part on traffic information associated with the expected travel route,
    at least one traffic delay along the expected travel route and occurring during a time interval between the current time and the future time; and
    sending, by the computing system, to the computing device, information based on the expected departure time and the traffic delay.

2. The method of claim 1, further comprising:
    determining, by the computing system, that the traffic delay will cause the user to arrive at the destination after the future time if the user begins traveling along the expected travel route at the expected departure time, wherein the information based on the expected departure time and the traffic delay includes an indication of an updated departure time for the user to begin traveling along the expected travel route to the destination such that the user will arrive at the destination by the future time.

3. The method of claim 1, further comprising:
    determining, by the computing system, that the traffic delay will cause the user to arrive at the destination after the future time if the user begins traveling along the expected travel route at the expected departure time, wherein the information based on the expected departure time and the traffic delay includes an indication of an alternative travel route to the destination such that the user will arrive at the destination by the future time.

4. The method of claim 1, further comprising:
    determining, by the computing system, the destination and the future time based on event information included in a calendar associated with the user.

5. The method of claim 1, further comprising:
    identifying, by the computing system and based on the location history, a home location associated with the user, the home location being a first location in the location history that is associated with multiple times of day during a nighttime;
    identifying, by the computing system and based on the location history, a work location associated with the user, the work location being a second location in the location history that is associated with multiple times of day during a daytime; and
    determining, by the computing system, that the expected travel route of the user is a commuting travel route the user takes between the home location and the work location.

6. The method of claim 1, further comprising:
    determining, by the computing system and based on the location history, the expected departure time as being an average departure time when the user has previously started traveling along the expected travel route.

7. The method of claim 1, further comprising:
    determining, by the computing system and based on the location history, a mode of transportation associated with the user for traveling along the expected travel route, wherein determining the traffic information associated with the expected travel route includes determining the traffic information based on the mode of transportation.

8. The method of claim 1, further comprising:
    determining, by the computing system, that the computing device is charging at an initial time associated with the computing device, the initial time occurring before the current time;
    determining, by the computing system, that the computing device is no longer charging at the current time associated with the computing device;
    responsive to determining that the computing device is no longer charging at the current time, determining, by the computing system, that the user will begin traveling to the destination within a time threshold of the current time; and
    responsive to determining that the user will begin traveling to the destination within the time threshold of the current time, determining, by the computing system, the expected departure time to be within the time threshold of the current time.

9. The method of claim 1, further comprising:
determining, by the computing system and based on the location history, a previous travel route that the user has taken from a current location of the computing device to the destination; and
determining, by the computing system, that the expected travel route of the user is the previous travel route.

10. The method of claim 1, further comprising:
determining, by the computing system, based on the location history, at least one of the destination or the future time.

11. A computing system comprising:
at least one processor; and
at least one module operable by the at least one processor to:
receive a location history associated with a computing device and device information that indicates that the computing device is no longer charging at a current time;
determine, based on the location history, an expected travel route of a user of the computing device to travel along to a destination
and one or more past departure times when the user began traveling along the expected travel route to the destination;
determine, based at least in part on the one or more past departure times and the device information, an expected departure time for the user to begin traveling along the expected travel route to the destination such that the user arrives at the destination by a future time;
determine, based at least in part on traffic information associated with the expected travel route,
at least one traffic delay along the expected travel route and occurring during a time interval after the current time and before the future time; and
send, to the computing device, information based on the expected departure time and the traffic delay.

12. The computing system of claim 11, wherein the at least one module is further operable by the at least one processor to:
determine that the traffic delay will cause the user to arrive at the destination after the future time if the user begins traveling along the expected travel route at the expected departure time, wherein the information based on the expected departure time and the traffic delay includes an indication of an updated departure time for the user to begin traveling along the expected travel route to the destination such that the user will arrive at the destination by the future time.

13. The computing system of claim 11, wherein the at least one module is further operable by the at least one processor to:
determine that the traffic delay will cause the user to arrive at the destination after the future time if the user begins traveling along the expected travel route at the expected departure time, wherein the information based on the expected departure time and the traffic delay includes an indication of an alternative travel route to the destination such that the user will arrive at the destination by the future time.

14. The computing system of claim 11, wherein the at least one module is further operable by the at least one processor to determine the destination and the future time based on event information included in a calendar associated with the user.

15. The computing system of claim 11, wherein the at least one module is further operable by the at least one processor to:
identify, based on the location history, a home location associated with the user, the home location being a first location in the location history that is associated with multiple times of day during a nighttime;
identify, based on the location history, a work location associated with the user, the work location being a second location in the location history that is associated with multiple times of day during a daytime; and
determine that the expected travel route of the user is a commuting travel route the user takes between the home location and the work location.

16. The computing system of claim 11, wherein the at least one module is further operable by the at least one processor to determine, based on the location history, the expected departure time as being an average departure time when the user has started traveling along the expected travel route.

17. The computing system of claim 11, wherein the at least one module is further operable by the at least one processor to determine, based on the location history, a mode of transportation associated with the user for traveling along the expected travel route, wherein the traffic information associated with the expected travel route is determined based on the mode of transportation.

18. The computing system of claim 11, wherein the at least one module is further operable by the at least one processor to:
determine that the computing device is charging at an initial time associated with the computing device, the initial time occurring before the current time;
determine that the computing device is no longer charging at the current time associated with the computing device;
responsive to determining that the computing device is no longer charging at the current time, determine that the user will begin traveling to the destination within a time threshold of the current time; and
responsive to determining that the user will begin traveling to the destination within the time threshold of the current time, determine, the expected departure time to be within the time threshold of the current time.

19. The computing system of claim 11, wherein the at least one module is further operable by the at least one processor to:
determine, based on the location history, a previous travel route that the user has taken from a current location of the computing device to the destination; and
determine that the expected travel route of the user is the previous travel route.

20. The method of claim 1, further comprising:
determining, by the computing system and based on the location history, the expected departure time as being a recurring departure time associated with two or more prior instances when the user has started traveling along the expected travel route.

* * * * *